(12) United States Patent
Ahrens

(10) Patent No.: US 7,044,013 B2
(45) Date of Patent: May 16, 2006

(54) TWIN-CLUTCH TRANSMISSION AND BEARING SYSTEM FOR THE INPUT SHAFTS OF A TWIN-CLUTCH TRANSMISSION

(75) Inventor: Rainer Ahrens, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 90 days.

(21) Appl. No.: 10/832,577

(22) Filed: Apr. 26, 2004

(65) Prior Publication Data

US 2004/0200300 A1     Oct. 14, 2004

Related U.S. Application Data

(63) Continuation of application No. PCT/EP02/11036, filed on Oct. 2, 2002.

(30) Foreign Application Priority Data

Oct. 26, 2001   (DE) .............................. 101 53 014

(51) Int. Cl.
*F16H 3/08*   (2006.01)
(52) U.S. Cl. ........................................ 74/331
(58) Field of Classification Search ................ 74/330, 74/331
See application file for complete search history.

(56) References Cited

U.S. PATENT DOCUMENTS

| | | |
|---|---|---|
| 2,396,456 A | 3/1946 | Campodonico |
| 2,485,688 A | 10/1949 | Banker |
| 5,240,093 A | 8/1993 | Wagner et al. |
| 6,250,171 B1 | 6/2001 | Sperber et al. |
| 6,523,657 B1 | 2/2003 | Kundermann et al. |

FOREIGN PATENT DOCUMENTS

| | | |
|---|---|---|
| DE | 36 26 179 A1 | 2/1988 |
| DE | 39 28 133 A1 | 3/1990 |
| DE | 41 17 736 C1 | 5/1992 |
| DE | 41 23 493 A1 | 1/1993 |
| DE | 198 21 164 A1 | 11/1999 |
| DE | 198 60 251 C1 | 11/2000 |
| DE | 100 04 195 A1 | 4/2001 |
| EP | 0 206 734 A1 | 12/1986 |
| GB | 2 195 721 A | 4/1988 |
| GB | 2 258 020 A | 1/1993 |

*Primary Examiner*—Dirk Wright

(57) ABSTRACT

A bearing system for coaxial input shafts of a twin-clutch transmission mounts the outer input shaft rotatably on the inner input shaft via at least two internal radial roller bearings which are mounted on the inner input shaft. The outer input shaft is secured in an axial direction thereof via two axial roller bearings which are effective in respective opposite directions. The inner input shaft is secured in an axial direction thereof and is rotatably mounted, via a fixed roller bearing, in an external housing wall on the engine-remote side of the transmission housing. The inner input shaft is mounted rotatably and displaceably in the axial direction in an internal housing wall of the transmission on the engine side via an external radial roller bearing which is mounted on the outer input shaft.

13 Claims, 1 Drawing Sheet

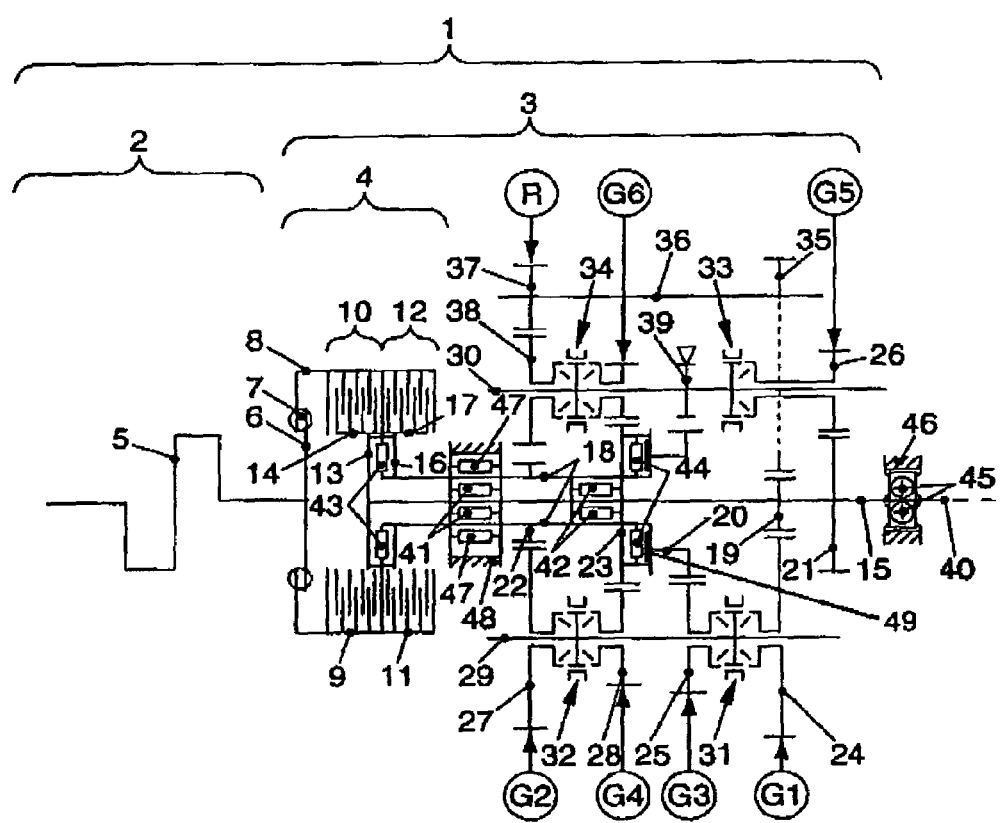

TWIN-CLUTCH TRANSMISSION AND BEARING SYSTEM FOR THE INPUT SHAFTS OF A TWIN-CLUTCH TRANSMISSION

CROSS-REFERENCE TO RELATED APPLICATION

This application is a continuation, under 35 U.S.C. § 120, of copending international application No. PCT/EP02/11036, filed Oct. 2, 2002, which designated the United States; this application also claims the priority, under 35 U.S.C. § 119, of German patent application No. 101 53 014.5, filed Oct. 26, 2001; the prior applications are herewith incorporated by reference in their entirety.

BACKGROUND OF THE INVENTION

FIELD OF THE INVENTION

The invention relates to a twin-clutch transmission and a bearing system for the input shafts of a twin-clutch transmission, in particular of a motor vehicle. The twin-clutch transmission has a first input shaft which is connected on its engine side to a first engine clutch outside a transmission housing, and has, inside the transmission housing, a plurality of gear speeds of a first group of gear speeds. The twin-clutch transmission has a second input shaft which is embodied as a hollow shaft, is disposed coaxially over the first input shaft and is connected on its engine side to a second engine clutch outside the transmission housing, and has, inside the transmission housing, a plurality of gear wheels of a second group of gear speeds. The twin-clutch transmission has at least one drive shaft which is disposed in parallel with the two input shafts and has corresponding gear wheels which are in engagement with the gear wheels of the input shafts.

Bearing systems have the purpose of supporting and guiding movable components such as, for example, shafts and hubs, and may be constructed from sliding bearings or from roller bearings. The respective construction and positioning of a bearing system is essentially dependent on the operating conditions, the loads which occur, the available installation space and the given cost constraints. In motor vehicle drive units and assigned clutch units, roller bearings, for example in the form of ball bearings, cylindrical roller bearings, tapered roller bearings and needle bearings, are preferably used due to their maintenance-free operation and their high operational reliability. The bearings are largely standardized and can therefore be manufactured or acquired economically in large numbers.

For example, Published, Non-Prosecuted German Patent Application No. DE 39 28 133 A1 discloses a speed change transmission for a motor vehicle, which is composed of a conventional gear speed change transmission, downstream of which a step-down transmission is provided in order to provide at least one further transmission ratio. The step-down transmission is embodied as a simple planetary gear mechanism with a sun wheel, a planetary wheel carrier and an annular gear, and can be shifted by a multiple disk clutch which is effective on both sides. Assigned components such as, for example, a hollow shaft which is connected to the annular gear wheel and a multiple disk carrier which is connected to the sun wheel are each mounted with respect to fixed and/or rotating components by a plurality of radial and axial bearings which are embodied as cylindrical roller bearings. Furthermore, Published, Non-Prosecuted German Patent Application No. DE 100 04 195 A1 discloses a twin-clutch device which is constructed from two multiple disk clutches and in which a multiple disk carrier on the engine side is mounted in a similar way with respect to an input shaft of the assigned transmission, a transmission-side multiple disk carrier and a housing cover by using a plurality of radial and axial bearings. Depending on the particular application cases, these bearing systems are configured to support hub-like components which are relatively short in the axial direction and relatively large in the radial direction and which have disk-shaped sections. Thus these bearing systems cannot be readily applied for supporting shafts. A relatively long transmission shaft is generally provided with a plurality of supports in order to avoid alignment errors and relatively large bending moments, and for the sake of stress-free installation and in order to compensate thermal stresses only one of the bearings can be embodied as a fixed bearing, through the use of which the transmission shaft is axially guided and axial forces which occur are absorbed.

Finally, Published, Non-Prosecuted German Patent Application No. DE 41 23 493 A1 proposes a bearing system for transmission shafts of a motor vehicle transmission which is embodied as a twin-clutch transmission with an intermediate transmission configuration, i.e. in which the input shafts which are arranged coaxially with respect to one another are arranged in line, and thus also coaxially with the output shaft, and with the exception of the direct path, the transmission of force takes place from one of the input shafts into an intermediate shaft via a first pair of gear wheels, and from the shaft into the output shaft via a second pair of gear wheels. The centrally arranged first input shaft is mounted on an engine-side main drive shaft through the use of a radial needle bearing (movable bearing), and on the output shaft via a radial cylindrical roller bearing (movable bearing) and a fixed bearing, embodied as a double-row angular contact ball bearing, in a section which is embodied as a hollow shaft and in which two gear rims are arranged. The second input shaft which is embodied as a hollow shaft, is placed over the first input shaft and has a gear rim, is mounted on the first input shaft through the use of a radial needle bearing (movable bearing) and a radial cylindrical roller bearing (movable bearing), and is mounted in a housing wall of the transmission housing through the use of a fixed bearing which is embodied as a single-row deep groove ball bearing. Alternatively, it is proposed to mount the second input shaft on the first input shaft through the use of a radial needle bearing (movable bearing) and a fixed bearing which is embodied as a single-row deep groove ball bearing, and in the housing wall through the use of a radial cylindrical roller bearing (movable bearing). Together with a fixed bearing which is embodied as a double-row angular contact ball bearing and through the use of which the output shaft is mounted fixed to the housing, these bearing systems disadvantageously result in a requirement for installation space which is particularly large in the axial direction, i.e. the respective transmission is unfavorably long due, inter alia, to the bearing system, and is thus unsuitable for transverse installation of the drive unit which is made up of the drive engine and the transmission.

SUMMARY OF THE INVENTION

It is accordingly an object of the invention to provide a twin-clutch transmission configuration and a bearing system for input shafts of a twin-clutch transmission which overcome the above-mentioned disadvantages of the heretofore-known twin-clutch transmissions and bearing systems for input shafts of twin-clutch transmissions of this general type and which require as little installation space as possible, in particular in the axial direction, in view of a transverse installation of the drive unit, and which further result in low fabrication costs and are insensitive to tolerances.

With the foregoing and other objects in view there is provided, in accordance with the invention, a twin-clutch transmission configuration, including:

a transmission housing defining an engine side and an engine-remote side, the transmission housing having an external housing wall on the engine-remote side and an internal housing wall on the engine side;

a first engine clutch;

a second engine clutch;

a first input shaft connected, outside the transmission housing on the engine side, to the first engine clutch;

the first input shaft having a plurality of gear wheels for a first group of gear speeds, the plurality of gear wheels for the first group of gear speeds being disposed inside the transmission housing;

a second input shaft embodied as a hollow shaft, the second input shaft being disposed coaxially over the first input shaft, the second input shaft being connected, outside the transmission housing on the engine side, to the second engine clutch;

the second input shaft having a plurality of gear wheels for a second group of gear speeds, the plurality of gear wheels for the second group of gear speeds being disposed inside the transmission housing;

at least one drive shaft disposed parallel with the first input shaft and the second input shaft;

the at least one drive shaft having counter gear wheels in engagement with the plurality of gear wheels for the first group of gear speeds and the plurality of gear wheels for the second group of gear speeds;

at least two internal radial roller bearings;

two axial roller bearings provided to be effective in respective opposite directions;

the second input shaft being rotatably mounted on the first input shaft via the at least two internal radial roller bearings and being secured in an axial direction thereof via the two axial roller bearings;

a fixed roller bearing;

an external radial roller bearing provided on the second input shaft;

the first input shaft being secured in an axial direction thereof and rotatably mounted, via the fixed roller bearing, in the external housing wall on the engine-remote side; and the first input shaft being mounted rotatably and displaceably in the axial direction, via the external radial roller bearing, in the internal housing wall on the engine side.

With the objects of the invention in view there is also provided, a bearing system in a twin-clutch transmission, the twin-clutch transmission having a transmission housing defining an engine side and an engine-remote side, the transmission housing having an external housing wall on the engine-remote side and an internal housing wall on the engine side, a first engine clutch and a second engine clutch, a first input shaft being connected, outside the transmission housing on the engine side, to the first engine clutch, the first input shaft having a plurality of gear wheels for a first group of gear speeds, the plurality of gear wheels for the first group of gear speeds being disposed inside the transmission housing, a second input shaft being embodied as a hollow shaft, the second input shaft being disposed coaxially over the first input shaft, the second input shaft being connected, outside the transmission housing on the engine side, to the second engine clutch, the second input shaft having a plurality of gear wheels for a second group of gear speeds, the plurality of gear wheels for the second group of gear speeds being disposed inside the transmission housing, at least one drive shaft being disposed parallel with the first input shaft and the second input shaft, the at least one drive shaft having counter gear wheels in engagement with the plurality of gear wheels for the first group of gear speeds and the plurality of gear wheels for the second group of gear speeds, wherein the bearing system includes:

at least two internal radial roller bearings;

two axial roller bearings provided to be effective in respective opposite directions, the second input shaft being rotatably mounted on the first input shaft via the at least two internal radial roller bearings and being secured in an axial direction thereof via the two axial roller bearings;

a fixed roller bearing; and an external radial roller bearing provided on the second input shaft, the first input shaft being secured in an axial direction thereof and rotatably mounted, via the fixed roller bearing, in the external housing wall on the engine-remote side of the transmission housing, the first input shaft being mounted rotatably and displaceably in the axial direction, via the external radial roller bearing, in the internal housing wall.

In other words, according to the invention, there is provided, a bearing system for the input shafts of a twin-clutch transmission, in particular of a motor vehicle, having a first input shaft which is connected on the engine side to a first engine clutch outside a transmission housing, and has, within the transmission housing, a plurality of gear wheels of a first group of gear speeds, having a second input shaft which is embodied as a hollow shaft, is provided coaxially over the first input shaft, is connected on the engine side to a second engine clutch outside the transmission housing, and has, inside the transmission housing, a plurality of gear wheels of a second group of gear speeds, and having at least one drive shaft which is disposed in parallel with the two input shafts and has corresponding gear wheels which are in engagement with the gear wheels of the input shafts, the second input shaft being mounted in a rotatable and axially secured fashion on the first input shaft by at least two internal radial roller bearings (movable bearing) and two axial roller bearings which are effective in the opposite direction, and the first input shaft being mounted in a rotatable fashion, axially secured in an external housing wall, on the side remote from the engine by a fixed roller bearing, and being mounted in a rotatable fashion, so as to be axially displaceable in an internal housing wall, on the engine side by an external radial roller bearing (movable bearing) which is provided on the second input shaft.

Through the use of the bearing system according to the invention, a saving is made, in comparison with the prior art, by eliminating at least one fixed bearing in the form of a single-row deep groove ball bearing or a double-row angular contact ball bearing with which the second input shaft is usually mounted in a housing wall of the transmission housing or on the first input shaft. Since such a ball bearing requires a relatively large amount of installation space in the radial and axial directions, as well as relatively precise and complex fabrication of the bearing seats, the saving achieved by eliminating the fixed bearing provides a saving both in terms of installation space and in terms of fabrication costs. The remaining fixed roller bearing with which the first input shaft is mounted fixed to the housing is disposed, for reasons of space, on the side facing away from the drive engine, between the corresponding shaft end of the input shaft and the external housing wall of the transmission housing, and is expediently embodied as a single-row deep groove ball bearing in order to reduce the requirement for axial space. The second input shaft is mounted essentially on the first input shaft through the use of the two internal radial roller bearings and the two axial roller bearings and forms with the input shaft a premountable assembly, while the external radial roller bearing is mainly effective as a movable bearing of the first input shaft, even if it is disposed between the second input shaft and the internal housing wall. A radial force which is effective on the engine side in the first input shaft is transmitted via the two internal radial roller bearings to the second input shaft and is transferred from there to the transmission housing via the external radial roller bearing. Here, in order to avoid bending moments which are effective in the second input shaft it is expedient if the external radial roller bearing and one of the internal radial roller bearings are disposed radially opposite one another, i.e. are in a largely identical position on the second input shaft in the axial direction so that the radial force is transmitted virtually directly from the internal radial roller bearing into the external radial roller bearing. In order to achieve as far as possible small tilting movements for the two input shafts with a given bearing play of the radial roller bearings, the axial distance between the fixed roller bearing and the radial roller bearings lying radially opposite should be configured to be as large as possible. Accordingly, the external radial roller bearing is advantageously disposed radially opposite the internal radial roller bearing on the engine side, and not opposite the internal radial roller bearing on the side remote from the engine. The radial roller bearings are preferably embodied as cylindrical roller bearings since this design has a small overall height in particular in the radial direction and can be acquired economically as a standardized component.

The two axial roller bearings are advantageously each disposed between radial faces, facing one another, of a radial bearing web of the first input shaft, and of a radial bearing web of the second input shaft, as a result of which, due to the rigid connection with the input shafts, a good transfer of axial forces which occur from the second input shaft into the first input shaft is brought about, and a saving can be made by eliminating additional bearing elements and securing elements such as, for example, bearing plates and securing rings. Given appropriate processing, the radial faces can also be used directly as bearing faces on which the roller bearings of the axial roller bearings roll, as a result of which a saving is achieved in terms of installation space in the axial direction. In order to compensate for fabrication tolerances between the radial faces or bearing faces of the two input shafts it is particularly expedient if there is provision for a spacing washer to be disposed between one of the axial roller bearings and one of the assigned radial faces. Spacing washers can be manufactured economically as ground sheet-metal plates with finely graduated thicknesses so that when the two input shafts are mounted it is possible to compensate easily for the respective difference in length. As a result, relatively large fabrication tolerances can be permitted when fabricating the input shafts, as a result of which the production costs of the transmission are reduced. In order to avoid separate bearing webs which take up installation space, the engine-side axial roller bearing is advantageously disposed between a clutch carrier, permanently connected to the first input shaft, of the first engine clutch and a clutch carrier, permanently connected to the second input shaft, of the second engine clutch. For the same reason, the axial roller bearing on the side remote from the engine is advantageously disposed between the first gear wheel, on the engine side, of the first input shaft and the first gear wheel, lying opposite on the side remote from the engine, of the second input shaft, in which case the respective gear wheels should be embodied as fixed gear wheels in order to avoid additional axial bearings between the gear wheels and the input shafts. The axial roller bearings are preferably embodied as axial needle bearings which have a small height in the axial direction with respect to the axis of rotation of the input shafts, and can be manufactured or acquired economically as a standardized part.

According to another feature of the invention, the fixed roller bearing is a single-row deep groove ball bearing.

According to yet another feature of the invention, the external radial roller bearing and one of the internal radial roller bearings are disposed radially opposite one another.

According to another feature of the invention, a first one of the internal radial roller bearings is disposed further toward the engine side than a second one of the internal radial roller bearings; and the external radial roller bearing and the first one of the internal radial roller bearings are disposed radially opposite one another.

According to a further feature of the invention, at least one of the internal radial roller bearings and/or at least one of the external radial roller bearings is a cylindrical roller bearing.

According to yet a further feature of the invention, at least one of the internal radial roller bearings and/or at least one of the external radial roller bearings is a movable or non-locating bearing.

According to another feature of the invention, the first input shaft and the second input shaft each have radial bearing webs, the radial bearing webs are provided such that radial faces of the radial bearing webs of the first input shaft respectively face corresponding radial faces of the radial bearing webs of the second input shaft; and the axial roller bearings are disposed between respective two of the radial faces that face one another.

According to yet another feature of the invention, a spacing washer for compensating axial fabrication tolerances of the first input shaft and the second input shaft can be provided, the spacing washer is disposed between one of the axial roller bearings and one the radial faces of one of the radial bearing webs.

According to a further feature of the invention, the first engine clutch has a clutch carrier fixedly connected to the first input shaft; the second engine clutch has a clutch carrier fixedly connected to the second input shaft; a first one of the axial roller bearings is disposed further toward the engine side than a second one of the axial roller bearings; and the first one of the axial roller bearings is disposed between the clutch carrier of the first engine clutch and the clutch carrier of the second engine clutch.

According to yet a further feature of the invention, a first one of the axial roller bearings is disposed further toward the engine-remote side than a second one of the axial roller bearings; a given one of the gear wheels of the first input shaft is disposed further toward the engine side than any other one of the gear wheels of the first input shaft; a given one of the gear wheels of the second input shaft is disposed further toward the engine-remote side than any other one of the gear wheels of the second input shaft and faces the given one of the gear wheels of the first input shaft; the first one of the axial roller bearings is disposed between the given one of the gear wheels of the first input shaft and the given one of the gear wheel of the second input shaft, wherein the given one the gear wheels of the first input shaft and the given one of the gear wheel of the second input shaft are preferably fixed gear wheels.

According to another feature of the invention, at least one of the axial roller bearings is an axial needle bearing.

Other features which are considered as characteristic for the invention are set forth in the appended claims.

Although the invention is illustrated and described herein as embodied in a twin-clutch transmission configuration with a bearing system for the input shafts of the twin-clutch transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic view of a drive unit composed of a drive engine and a twin-clutch transmission according to the invention.

DESCRIPTION OF THE PREFERRED EMBODIMENTS

Referring now to the single FIGURE of the drawing in detail, there is shown a drive unit 1 of a motor vehicle which is composed of a drive engine 2 and a twin-clutch transmission 3 with an assigned clutch unit 4. The drive engine 2 is embodied as an internal combustion engine and is symbolized by a crank shaft 5. The crank shaft 5 is connected to a clutch basket 8 of the clutch unit 4 via a fly wheel 6 and a rotary oscillation damper 7. The clutch basket 8 has a first multiple disk carrier 9 on the engine side, which carrier 9 is assigned to a first engine clutch 10 which is embodied as a multiple disk clutch, and a second multiple disk carrier 11 on the engine side, which carrier 11 is assigned to a second engine clutch 12 which is embodied as a multiple disk clutch. A first clutch carrier 13 of the first engine clutch 10 which has a first multiple disk carrier 14 on the transmission side is connected to a centrally disposed first input shaft 15 of the twin-clutch transmission 3. A second clutch carrier 16 of the second engine clutch 12 which has a second multiple disk carrier 17 on the transmission side is connected to a second input shaft 18 of the twin-clutch transmission 3, the second input shaft 18 being embodied as a hollow shaft, and being provided coaxially over the first input shaft 15. The first input shaft 15 has a plurality of gear wheels 19, 20, 21 of a first group of gear speeds which are formed by the odd-numbered forward gear speeds, i.e. the first forward gear speed G1, the third forward gear speed G3 and the fifth forward gear speed G5. The second input shaft 18 has a plurality of gear wheels 22, 23, of a second group of gear speeds which is formed by the even-numbered forward gear speeds, i.e. the second forward gear speed G2 and the fourth forward gear speed G4. The gear wheels 19–23 are each embodied as fixed gear wheels, i.e. are connected rigidly (fixed in terms of rotation and axially fixed) to the respective input shaft 15 and 18, respectively, and are in engagement with in each case one assigned corresponding gear wheel 24–28. The corresponding gear wheels 24–28 are embodied as movable gear wheels and are distributed among two drive shafts 29, 30 which are disposed in parallel with the input shafts 15, 18, i.e. are rotatably mounted on them. The gear speeds G1–G4 are assigned to the first drive shaft 29 and can be engaged by gear speed clutch devices 31, 32 which are effective on both sides, in each case a rotationally fixed connection between the respective movable wheel (corresponding gear wheel or counter gear wheel) and the drive shaft being brought about when a gear speed is engaged as a result of the closing of the gear speed clutch device. The gear speeds G5 and G6 are assigned to the second drive shaft 30 and can be engaged by a gear speed clutch device 33 which is effective on one side or by a gear speed clutch device 34 which is effective on both sides. The reverse gear R is connected to a corresponding gear wheel (counter gear wheel) 38 via a first reversing gear wheel 35 which is in engagement with the gear wheel 19 of the first gear speed G1, a secondary shaft 36 and a second reversing gear wheel 37, the corresponding gear wheel 38 being rotatably mounted on the second drive shaft 30 and being capable of being engaged through the use of the gear speed clutch device 34. Finally, a lockable fixed wheel 39, which is effective as a parking brake, is provided on the second drive shaft 30.

In order to achieve a compact configuration of the twin-clutch transmission 3, the drive shafts 29, 30 are actually disposed in a V shape about the axis 40 of rotation of the input shafts 15, 18, and the secondary shaft 36 is located further inwards, rotated about the second drive shaft 30. In order to simplify the representation, the drive shafts 29, 30 and the secondary shaft 36 are represented folded into the plane of the drawing. The drive shafts 29, 30 are each connected via an output gear wheel to a differential gear mechanism from which the output torque of the twin-clutch transmission is distributed among the drive wheels of the associated motor vehicle. A gear-shifting process from an engaged, old gear speed into a new gear speed is normally carried out by changing the input shaft without interrupting the tractive force, specifically by virtue of the fact that the new gear speed which is assigned to the other input shaft is engaged when the engine clutch is open, and then the engine clutch assigned to the old gear speed is opened, in a chronologically overlapping fashion, and the engine clutch which is assigned to the new gear speed is closed, and finally the old gear speed is disengaged.

According to the invention, the second input shaft 18 is mounted on the first input shaft 15 in a rotatable and axially secured fashion through the use of two internal radial roller bearings 41, 42 which are preferably embodied as cylindrical roller bearings, one internal radial roller bearing 41 on the engine side and one internal radial roller bearing 42 on the side remote from the engine, in order to take up radial forces, and through the-use of two axial roller bearings 43, 44 which are preferably embodied as axial needle bearings and are effective in the opposite direction, one axial roller bearing 43 being on the engine side and one axial roller bearing 44 on the side remote from the engine, in order to take up axial forces. The first input shaft 15 is rotatably mounted, axially secured in an external housing wall 46 of a transmission housing, on the side remote from the engine through the use of a fixed roller bearing 45 which is preferably embodied as a single-row deep groove ball bearing, and is rotatably mounted so as to be axially displaceable in an internal housing wall 48 of the transmission housing or of a clutch housing, on the engine side through the use of an external radial roller bearing 47 which is provided on the second input shaft 18 and is preferably embodied as a cylindrical roller bearing. The external radial roller bearing 47 is disposed radially opposite the internal radial roller bearing 41 on the engine side so that a radial force on the engine side is transmitted directly, and without subjecting the second input shaft 18 to bending stress, from the first input shaft 15 into the inner housing wall 48 via the internal radial roller bearing 41 on the engine side and the external radial roller bearing 47. Moreover, as a result of the largest possible axial distance between the fixed roller bearing 45 and the external radial roller bearing 47, a high degree of stability against tilting movements of the first input shaft 15 and of the second input shaft 18 which is mounted on it is achieved. The axial roller bearing 43 on the engine side is arranged between the clutch carrier 13, permanently connected to the first input shaft 15, of the first engine clutch 10 and the clutch carrier 16, permanently connected to the second input shaft 18, of the second engine clutch 12, and the axial roller bearing 44 on the side remote from the engine is arranged between the gear wheel 20, permanently connected to the first input shaft 15, of the third gear speed G3 and the gear speed 23, lying opposite and permanently connected to the second input shaft 18, of the fourth gear speed G4, as a result of which in each case two separate radial bearing webs on the input shafts 15, 18 are avoided, and there is a saving in installation space in particular in the axial direction. In order to compensate for axial fabrication tolerances of the two input shafts 15, 18 it is possible to provide a spacing washer 49, for example in the form of a precisely ground sheet-metal disk, between one of the axial roller bearings 43, 44 and one of the assigned radial faces or bearing faces, with the result that relatively large fabrication tolerances of the input shafts 15, 18 can be permitted in order to reduce the fabrication costs. As a result of the bearing system according to the invention, there is a saving in particular in axial installation space so that the twin-clutch transmission 3 can be configured to be particularly short in order to install the drive unit 1 transversely. Moreover, the fabrication costs are relatively low as a result of the use of largely standardized roller bearings and the permissible large fabrication tolerances of the input shafts 15, 18.

I claim:

1. A twin-clutch transmission configuration, comprising:
   a transmission housing defining an engine side and an engine-remote side, said transmission housing having an external housing wall on the engine-remote side and an internal housing wall on the engine side;
   a first engine clutch;
   a second engine clutch;
   a first input shaft connected, outside said transmission housing on the engine side, to said first engine clutch;
   said first input shaft having a plurality of gear wheels for a first group of gear speeds, said plurality of gear wheels for the first group of gear speeds being disposed inside said transmission housing;
   a second input shaft embodied as a hollow shaft, said second input shaft being disposed coaxially over said first input shaft, said second input shaft being connected, outside said transmission housing on the engine side, to said second engine clutch;
   said second input shaft having a plurality of gear wheels for a second group of gear speeds, said plurality of gear wheels for the second group of gear speeds being disposed inside said transmission housing;
   at least one drive shaft disposed parallel with said first input shaft and said second input shaft;
   said at least one drive shaft having counter gear wheels in engagement with said plurality of gear wheels for the first group of gear speeds and said plurality of gear wheels for the second group of gear speeds;
   at least two internal radial roller bearings;
   two axial roller bearings provided to be effective in respective opposite directions;
   said second input shaft being rotatably mounted on said first input shaft via said at least two internal radial roller bearings and being secured in an axial direction thereof via said two axial roller bearings;
   a fixed roller bearing;
   an external radial roller bearing provided on said second input shaft;
   said first input shaft being secured in an axial direction thereof and rotatably mounted, via said fixed roller bearing, in said external housing wall on the engine-remote side; and
   said first input shaft being mounted rotatably and displaceably in the axial direction, via said external radial roller bearing, in said internal housing wall on the engine side.

2. The twin-clutch transmission configuration according to claim 1, wherein said fixed roller bearing is a single-row deep groove ball bearing.

3. The twin-clutch transmission configuration according to claim 1, wherein said external radial roller bearing and one of said internal radial roller bearings are disposed radially opposite one another.

4. The twin-clutch transmission configuration according to claim 1, wherein:
   a first one of said internal radial roller bearings is disposed further toward the engine side than a second one of said internal radial roller bearings; and
   said external radial roller bearing and said first one of said internal radial roller bearings are disposed radially opposite one another.

5. The twin-clutch transmission configuration according to claim 1, wherein at least one roller bearing selected from the group consisting of said internal radial roller bearings and said external radial roller bearings is a cylindrical roller bearing.

6. The twin-clutch transmission configuration according to claim 1, wherein at least one roller bearing selected from the group consisting of said internal radial roller bearings and said external radial roller bearings is a movable bearing.

7. The twin-clutch transmission configuration according to claim 1, wherein:
   said first input shaft and said second input shaft each have radial bearing webs, said radial bearing webs are provided such that radial faces of said radial bearing webs of said first input shaft respectively face corresponding radial faces of said radial bearing webs of said second input shaft; and
   said axial roller bearings are disposed between respective two of said radial faces that face one another.

8. The twin-clutch transmission configuration according to claim 7, including a spacing washer for compensating axial fabrication tolerances of said first input shaft and said second input shaft, said spacing washer being provided between one of said axial roller bearings and one said radial faces of one of said radial bearing webs.

9. The twin-clutch transmission configuration according to claim 1, wherein:
   said first engine clutch has a clutch carrier fixedly connected to said first input shaft;
   said second engine clutch has a clutch carrier fixedly connected to said second input shaft;

a first one of said axial roller bearings is disposed further toward the engine side than a second one of said axial roller bearings; and said first one of said axial roller bearings is disposed between said clutch carrier of said first engine clutch and said clutch carrier of said second engine clutch.

10. The twin-clutch transmission configuration according to claim 1, wherein:

a first one of said axial roller bearings is disposed further toward the engine-remote side than a second one of said axial roller bearings;

a given one of said gear wheels of said first input shaft is disposed further toward the engine side than any other one of said gear wheels of said first input shaft;

a given one of said gear wheels of said second input shaft is disposed further toward the engine-remote side than any other one of said gear wheels of said second input shaft and faces said given one of said gear wheels of said first input shaft; and said first one of said axial roller bearings is disposed between said given one of said gear wheels of said first input shaft and said given one of said gear wheel of said second input shaft.

11. The twin-clutch transmission configuration according to claim 10, wherein said given one said gear wheels of said first input shaft and said given one of said gear wheels of said second input shaft are fixed gear wheels.

12. The twin-clutch transmission configuration according to claim 1, wherein at least one of said axial roller bearings is an axial needle bearing.

13. In a twin-clutch transmission having a transmission housing defining an engine side and an engine-remote side, the transmission housing having an external housing wall on the engine-remote side and an internal housing wall on the engine side, a first engine clutch and a second engine clutch, a first input shaft being connected, outside the transmission housing on the engine side, to the first engine clutch, the first input shaft having a plurality of gear wheels for a first group of gear speeds, the plurality of gear wheels for the first group of gear speeds being disposed inside the transmission housing, a second input shaft being embodied as a hollow shaft, the second input shaft being disposed coaxially over the first input shaft, the second input shaft being connected, outside the transmission housing on the engine side, to said second engine clutch, the second input shaft having a plurality of gear wheels for a second group of gear speeds, the plurality of gear wheels for the second group of gear speeds being disposed inside the transmission housing, at least one drive shaft being disposed parallel with the first input shaft and the second input shaft, the at least one drive shaft having counter gear wheels in engagement with the plurality of gear wheels for the first group of gear speeds and the plurality of gear wheels for the second group of gear speeds, a bearing system, comprising:

at least two internal radial roller bearings;

two axial roller bearings provided to be effective in respective opposite directions, the second input shaft being rotatably mounted on the first input shaft via said at least two internal radial roller bearings and being secured in an axial direction thereof via said two axial roller bearings;

a fixed roller bearing; and an external radial roller bearing provided on the second input shaft, the first input shaft being secured in an axial direction thereof and rotatably mounted, via said fixed roller bearing, in the external housing wall on the engine-remote side, the first input shaft being mounted rotatably and displaceably in the axial direction, via said external radial roller bearing, in the internal housing wall on the engine side.

* * * * *